United States Patent
Izumi et al.

(10) Patent No.: US 9,623,754 B2
(45) Date of Patent: Apr. 18, 2017

(54) ELECTRIC VEHICLE

(71) Applicant: Fuji Jukogyo Kabushiki Kaisha, Tokyo (JP)

(72) Inventors: Yoichi Izumi, Tokyo (JP); Tsukasa Murakami, Tokyo (JP)

(73) Assignee: FUJI JUKOGYO KABUSHIKI KAISHA, Shibuya-Ku, Tokyo (JP)

( * ) Notice: Subject to any disclaimer, the term of this patent is extended or adjusted under 35 U.S.C. 154(b) by 122 days.

(21) Appl. No.: 14/508,138

(22) Filed: Oct. 7, 2014

(65) Prior Publication Data

US 2015/0102666 A1   Apr. 16, 2015

(30) Foreign Application Priority Data

Oct. 11, 2013   (JP) .................................. 2013-213707

(51) Int. Cl.
| | |
|---|---|
| *B60L 3/12* | (2006.01) |
| *B60L 3/00* | (2006.01) |
| *B60L 3/04* | (2006.01) |

(52) U.S. Cl.
CPC ............... *B60L 3/12* (2013.01); *B60L 3/0007* (2013.01); *B60L 3/04* (2013.01)

(58) Field of Classification Search
CPC . B60L 3/0007; B60L 3/04; B60L 3/12; Y02T 10/7005
See application file for complete search history.

(56) References Cited

U.S. PATENT DOCUMENTS

| | | | | |
|---|---|---|---|---|
| 6,630,884 | B1* | 10/2003 | Shanmugham | G07C 5/0891 340/436 |
| 7,764,044 | B2* | 7/2010 | Ishikawa | B60K 6/445 307/45 |
| 2002/0158754 | A1* | 10/2002 | Tabata | B62J 27/00 340/438 |
| 2008/0281485 | A1* | 11/2008 | Plante | H04N 5/76 701/33.4 |
| 2010/0214055 | A1* | 8/2010 | Fuji | B60L 3/00 340/3.1 |

(Continued)

FOREIGN PATENT DOCUMENTS

| | | |
|---|---|---|
| JP | H07274301 A | 10/1995 |
| JP | 2004320877 A | 11/2004 |

(Continued)

*Primary Examiner* — Hal Kaplan
*Assistant Examiner* — Elim Ortiz
(74) *Attorney, Agent, or Firm* — Troutman Sanders LLP

(57) ABSTRACT

An electric vehicle includes: a low-voltage battery, a high-voltage battery having a voltage higher than that of the low-voltage battery; an output detector that detects an output of the low-voltage battery; a collision detector that detects a vehicle collision, an information recorder to which the low-voltage battery is connected as a power supply and which records collision information from the collision detector; a power supply relay unit that is provided between the high-voltage battery and the information recorder and switched between an opened state in which the high-voltage battery and the information recorder are separated and a closed state in which that are connected; and a controller that switches the power supply relay unit from the opened state to the closed state in the case when a vehicle collision a reduction in the output of the low-voltage battery are detected.

8 Claims, 5 Drawing Sheets

(56) References Cited

U.S. PATENT DOCUMENTS

| | | | | |
|---|---|---|---|---|
| 2012/0001480 A1* | 1/2012 | Favaretto | ................ | B60K 6/48 |
| | | | | 307/9.1 |
| 2013/0307480 A1* | 11/2013 | Boggs | ...................... | B60L 3/00 |
| | | | | 320/118 |
| 2015/0343904 A1* | 12/2015 | Ikeyama | ............... | B60L 3/0007 |
| | | | | 701/22 |

FOREIGN PATENT DOCUMENTS

| JP | 2011155743 A | 8/2011 |
|---|---|---|
| JP | 2011217544 A | 10/2011 |
| JP | 2012061955 A | 3/2012 |
| JP | 2013-062909 | 4/2013 |

* cited by examiner

FIG.3A

| First power supply signal (+B) (Low=0) (High=1) | Second power supply signal (IGN) (Low=0) (High=1) | Nor circuit processing result |
|---|---|---|
| 0 | 0 | 1 |
| 0 | 1 | 0 |
| 1 | 0 | 0 |
| 1 | 1 | 0 |

FIG.3B

| History information (Present=0) (Absent=1) | Collision signal (Present=1) (Absent=0) | Nor circuit processing result | And circuit processing result |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

ELECTRIC VEHICLE

CROSS-REFERENCE TO RELATED APPLICATIONS

The present application claims priority from Japanese Patent Application No. 2013-213707 filed on Oct. 11, 2013, the entire contents of which are hereby incorporated by reference.

BACKGROUND

1. Technical Field

The present invention relates to an electric vehicle that includes a first power storage unit and a second power storage unit having a voltage higher than that of the first power storage unit.

2. Related Art

An electric car having an electric motor as a power source and a hybrid car having an engine and an electric motor as the power sources are developed. On these electric vehicles, a high-voltage battery is mounted as a power supply for the electric motor. In addition, in order to secure safety at the time of a vehicle collision, an electric vehicle that separates the high-voltage battery from an electrical system at the time of the vehicle collision is developed (see Japanese Unexamined Patent Application Publication No. 2013-62909).

Incidentally, when a vehicle collides, a strong impact is exerted on the high-voltage battery, and there is a possibility that the internal portion of the high-voltage battery is damaged, and hence it becomes necessary to handle the high-voltage battery after the collision with care. Accordingly, in order to retain the fact that the high-voltage battery has undergone the impact as a history, it is conceived that collision information is recorded in a controller or the like at the time of the vehicle collision. However, a power supply for the controller or the like is often a low-voltage battery for auxiliary equipment, and it has not been possible to record the collision information in the case where the battery for auxiliary equipment is damaged at the time of the vehicle collision.

SUMMARY OF THE INVENTION

An object of the present invention is to record the collision information at the time of the vehicle collision.

An object of the present invention provides an electric vehicle including: a first power storage unit; a second power storage unit having a voltage higher than that of the first power storage unit; an output detector that detects an output of the first power storage unit; a collision detector that detects a vehicle collision; an information recorder to which the first power storage unit is connected as a power supply and which records collision information from the collision detector; a circuit opening/closing unit that is provided between the second power storage unit and the information recorder and is switched between a first state in which the second power storage unit and the information recorder are separated from each other and a second state in which the second power storage unit and the information recorder are connected to each other; and a controller that switches the circuit opening/closing unit from the first state to the second state in a case where the vehicle collision is detected by the collision detector and a reduction in the output of the first power storage unit is detected by the output detector. The information recorder records the collision information from the collision detector by using the second power storage unit as a power supply in the case where the vehicle collision is detected by the collision detector and the reduction in the output of the first power storage unit is detected by the output detector.

BRIEF DESCRIPTION OF THE DRAWINGS

FIG. 3A is a table illustrating a processing result of a NOR circuit, and FIG. 3B is a table illustrating a processing result of an AND circuit;

DETAILED DESCRIPTION

Figure 1:
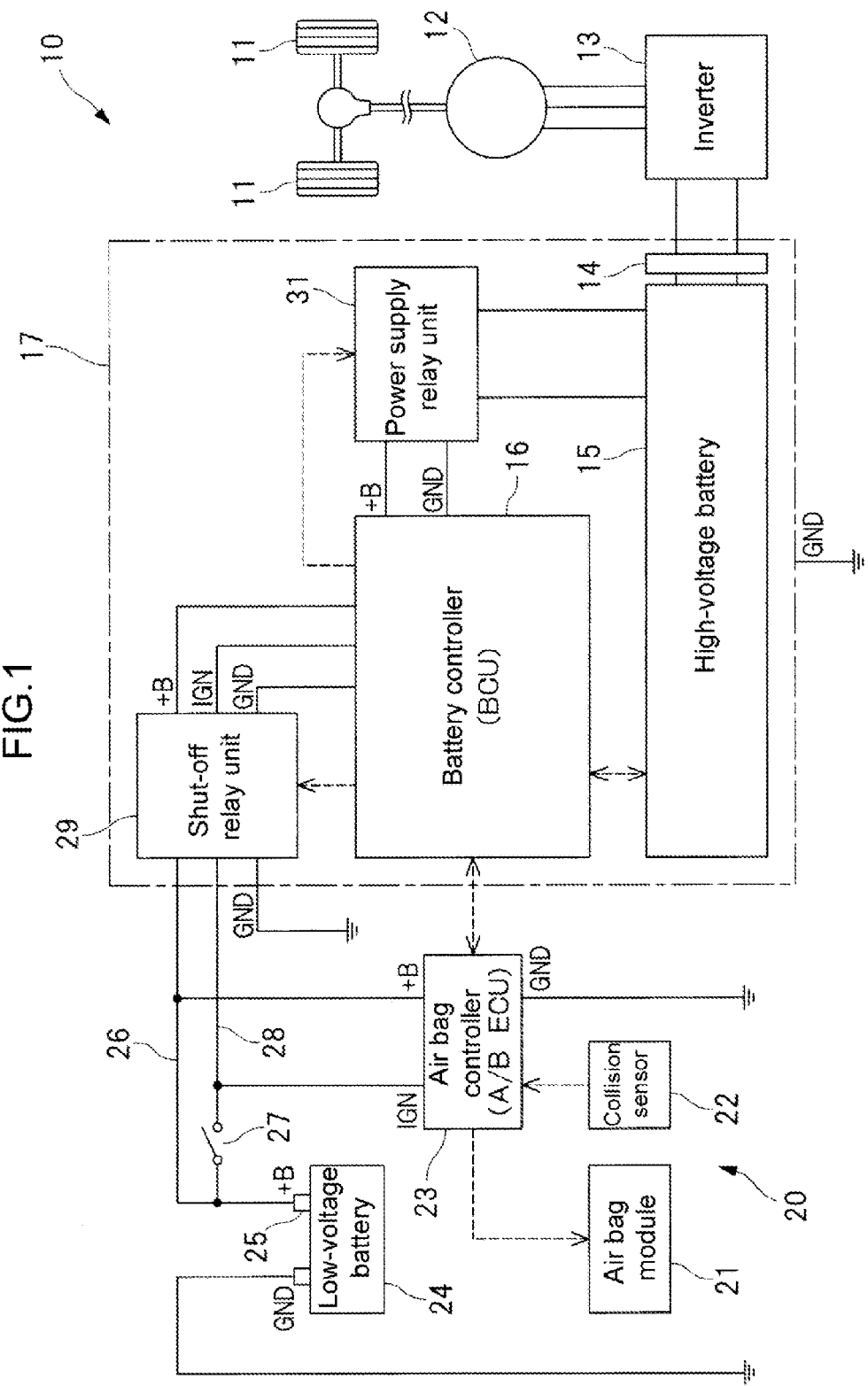
FIG. 1 is a schematic diagram illustrating a part of an electrical system of an electric vehicle as an implementation of the present invention.

Hereinbelow, an implementation of the present invention will be described in detail based on the drawings. FIG. 1 is a schematic diagram illustrating a part of an electrical system of an electric vehicle 10 as the implementation of the present invention. As illustrated in FIG. 1, the electric vehicle 10 has an electric motor 12 coupled to driving wheels 11. An inverter 13 is connected with the electric motor 12, and a high-voltage battery (second power storage unit) 15 is connected to the inverter 13 via a main relay 14. The high-voltage battery 15 serving as a power supply for the electric motor 12 is incorporated in a battery pack 17 together with a battery controller (BCU) 16. That is, the high-voltage battery 15 and the battery controller 16 are provided integrally. The battery controller 16 has not only a function of controlling charging and discharging of the high-voltage battery 15 but also a function of recording collision information at the time of a vehicle collision, as will be described later. Note that the battery controller 16 is configured by a CPU that calculates a control signal or the like, a ROM that stores a control program and map data, and a RAM that temporarily stores data.

The electric vehicle 10 has an air bag system 20. The air bag system 20 has an air bag module 21 that is expanded at the time of the vehicle collision, and a collision sensor 22 that detects a direction and an acceleration at the time of the vehicle collision. In addition, the air bag system 20 has an air bag controller (A/B ECU) 23 that outputs an expansion signal to the air bag module 21. The air bag controller 23 detects the magnitude of the collision based on a signal from the collision sensor 22, and determines whether or not the expansion of the air bag module 21 is necessary. That is, the airbag controller 23 functions as a collision detector that detects the vehicle collision. Note that the air bag controller 23 is configured by the CPU that calculates the control signal or the like, the ROM that stores the control program and the map data, and the RAM that temporarily stores data.

In addition, the electric vehicle 10 has a low-voltage battery (first power storage unit) 24 that functions as a power supply for the battery controller 16 and the air bag controller 23. A power supply line 26 is connected with a positive electrode terminal 25 of the low-voltage battery 24, and a power supply line 28 is connected to the positive electrode terminal 25 of the low-voltage battery 24 via an ignition switch 27. The air bag controller 23 is connected with the power supply lines 26 and 28, and the battery controller 16 is also connected to the power supply lines 26 and 28 via a shut-off relay unit 29. Note that the battery controller 16 and the airbag controller 23 operate with electric power supplied from the power supply line 26. As the low-voltage battery 24, for example, a lead battery having an output voltage of about 12 V is used. Further, as the high-voltage battery 15 described above, for example, a nickel-metal hydride battery or a lithium ion battery having an output voltage of about 100 V is used. Thus, the electric vehicle 10 is provided with the low-voltage battery 24 and the high-voltage battery 15 higher in voltage than the low-voltage battery 24. The low-voltage battery 24 is disposed in a front portion of a vehicle body such as an engine room or the like, while the high-voltage battery 15 is disposed in a rear portion of the vehicle body such as a trunk room or the like.

Figure 2:
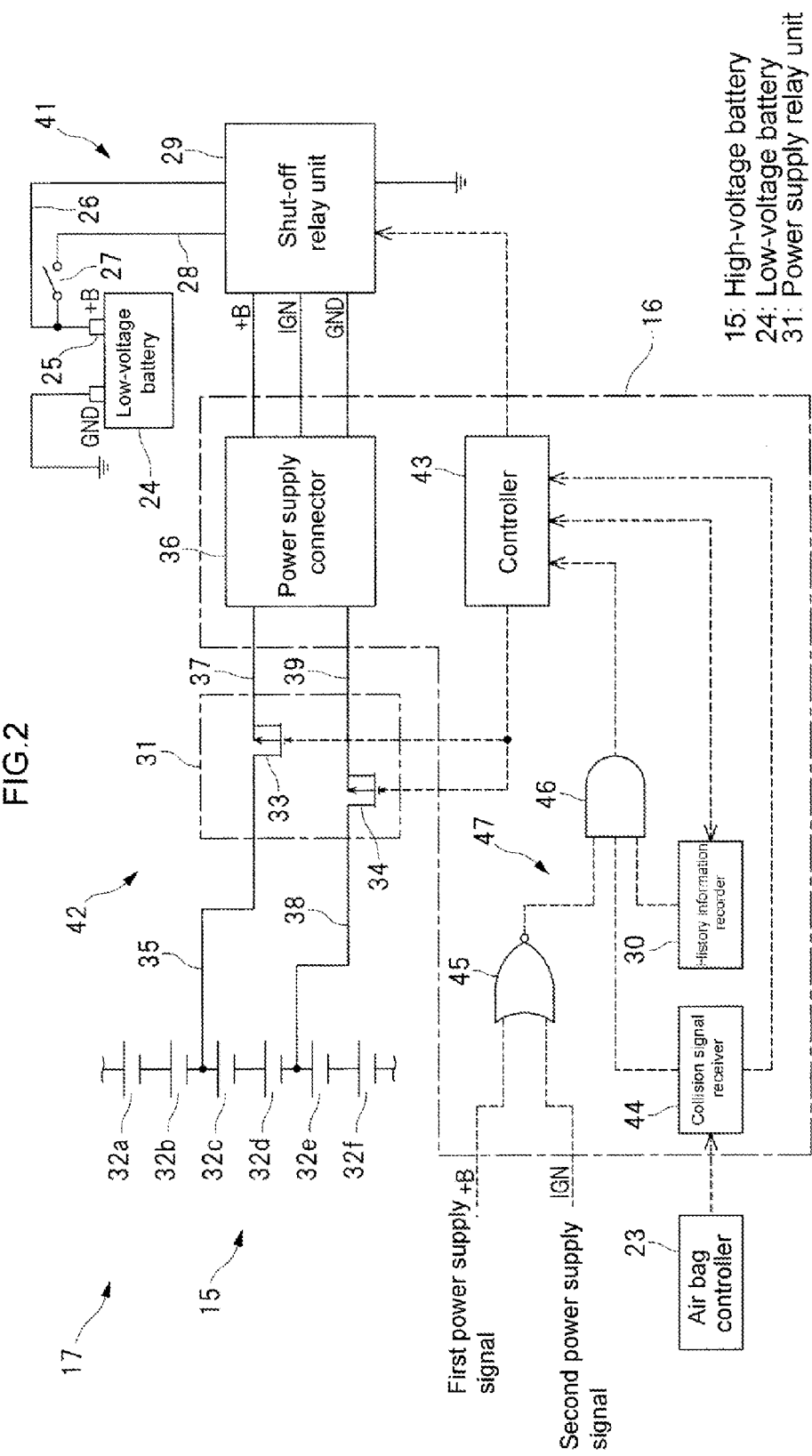
FIG. 2 is a schematic diagram illustrating a configuration of a battery pack.

FIG. 2 is a schematic diagram illustrating a configuration of the battery pack 17. As illustrated in FIG. 2, the battery controller 16 functioning as an information recorder has a history information recorder 30 that records the collision information of the electric vehicle 10 as a history. In the case where the electric vehicle 10 collides, a strong impact is exerted on the high-voltage battery 15 and there is a possibility that the high-voltage battery 15 is damaged, and hence it becomes necessary to handle the high-voltage battery 15 after the collision with care. Accordingly, by recording the collision information in the battery controller 16 in the battery pack 17, it becomes possible to improve safety when the battery pack 17 is used even in the case where the battery pack 17 is used for other purposes after the collision. That is, by checking the collision information of the battery controller 16, it becomes possible for a user to easily realize that the battery pack 17 has undergone the collision, and it becomes possible to improve safety when the battery pack 17 is used. In order to implement this, it is necessary to reliably record the collision information in the battery controller 16 at the time of the vehicle collision, and the power supply for the battery controller 16 is the low-voltage battery 24 mounted in the front portion of the vehicle body. Accordingly, there is a possibility that the low-voltage battery 24 is damaged at the time of the vehicle collision, the operation of the battery controller 16 is stopped, and the collision information is not recorded in the battery controller 16.

To cope with this, a power supply relay unit (circuit opening/closing unit) 31 is provided between the battery controller 16 and the high-voltage battery 15. As illustrated in FIG. 2, the high-voltage battery 15 has battery cells (power storage elements) 32a to 32f that are connected in series. Note that FIG. 2 illustrates the battery cells 32a to 32f as a part of the battery cells. The power supply relay unit 31 provided between the high-voltage battery 15 and the battery controller 16 includes a pair of semiconductor relays 33 and 34 that are switched between an opened state and a closed state. The semiconductor relay 33 is provided between an energization line 35 connected between the battery cells 32b and 32c of the high-voltage battery 15 and an energization line 37 connected with a power supply connector 36 of the battery controller 16. The other semiconductor relay 34 is provided between an energization line 38 connected between the battery cells 32d and 32e of the high-voltage battery 15 and an energization line 39 connected with the power supply connector 36 of the battery controller 16.

When each of the semiconductor relays 33 and 34 is switched to the opened state, the power supply relay unit 31 is brought into an opened state (first state), and the power supply connector 36 is separated from the two battery cells 32c and 32d via the power supply relay unit 31. On the other hand, when each of the semiconductor relays 33 and 34 is switched to the closed state, the power supply relay unit 31 is brought into a closed state (second state), and the power supply connector 36 is connected to the two battery cells 32c and 32d via the power supply relay unit 31. Herein, the output voltage of each of the battery cells 32a to 32f is about 6 V, and hence electric power of about 12 V is supplied to the power supply connector 36 from the two battery cells 32c and 32d. Thus, a first power supply system 41 having the low-voltage battery 24 as the power supply is connected to the power supply connector 36 of the battery controller 16, and a second power supply system 42 having a part of the high-voltage battery 15 as the power supply is also connected to the power supply connector 36 thereof. As described above, the output voltage of the first power supply system 41 is about 12 V, and the output voltage of the second power supply system 42 is also about 12 V similarly to the first power supply system 41.

In addition, the battery controller 16 functioning as a controller has a controller 43 that controls the power supply relay unit 31 and the shut-off relay unit 29. The history information recorder 30 that records history information (collision information) is connected with the controller 43, and a collision signal receiver 44 that receives a collision signal from the air bag controller 23 is also connected with the controller 43. In addition, a logic circuit unit 47 that includes a NOR circuit 45 and an AND circuit 46 is connected with the controller 43. To the NOR circuit 45, a first power supply signal (+B) is inputted from the power supply line 26, and a second power supply signal (IGN) is inputted from the power supply line 28. To the AND circuit 46, a processing result of the NOR circuit 45 is inputted, the collision signal is inputted from the collision signal receiver 44, and the history information is inputted from the history information recorder 30.

Herein, FIG. 3A is a table illustrating the processing result of the NOR circuit 45, and FIG. 3B is a table illustrating the processing result of the AND circuit 46. As illustrated in FIG. 3A, the NOR circuit 45 outputs a high potential signal (1) as the processing result when each of the first power supply signal (+B) and the second power supply signal (IGN) is a low potential signal (0). Thus, in the case where the output voltage of the low-voltage battery 24 is reduced, i.e., in the case where there is a possibility that the low-voltage battery 24 ceases to function as the power supply, the NOR circuit 45 outputs the high potential signal (1) as the processing result. In this manner, the battery controller 16 functions as an output detector that detects the output of the low-voltage battery 24. In addition, as illustrated in FIG. 3B, the AND circuit 46 outputs the high potential signal (1) as the processing result when the history information is not recorded in the collision signal receiver 44, the collision signal is received by the collision signal receiver 44, and the processing result of the NOR circuit 45 is the high potential signal (1). The controller 43 having received the high potential signal (1) from the AND circuit 46 controls the power supply relay unit 31 and the shut-off relay unit 29 to thereby secure the power supply for the battery controller 16, and record the history information of the collision in the battery controller 16, as will be described later.

Figure 4:
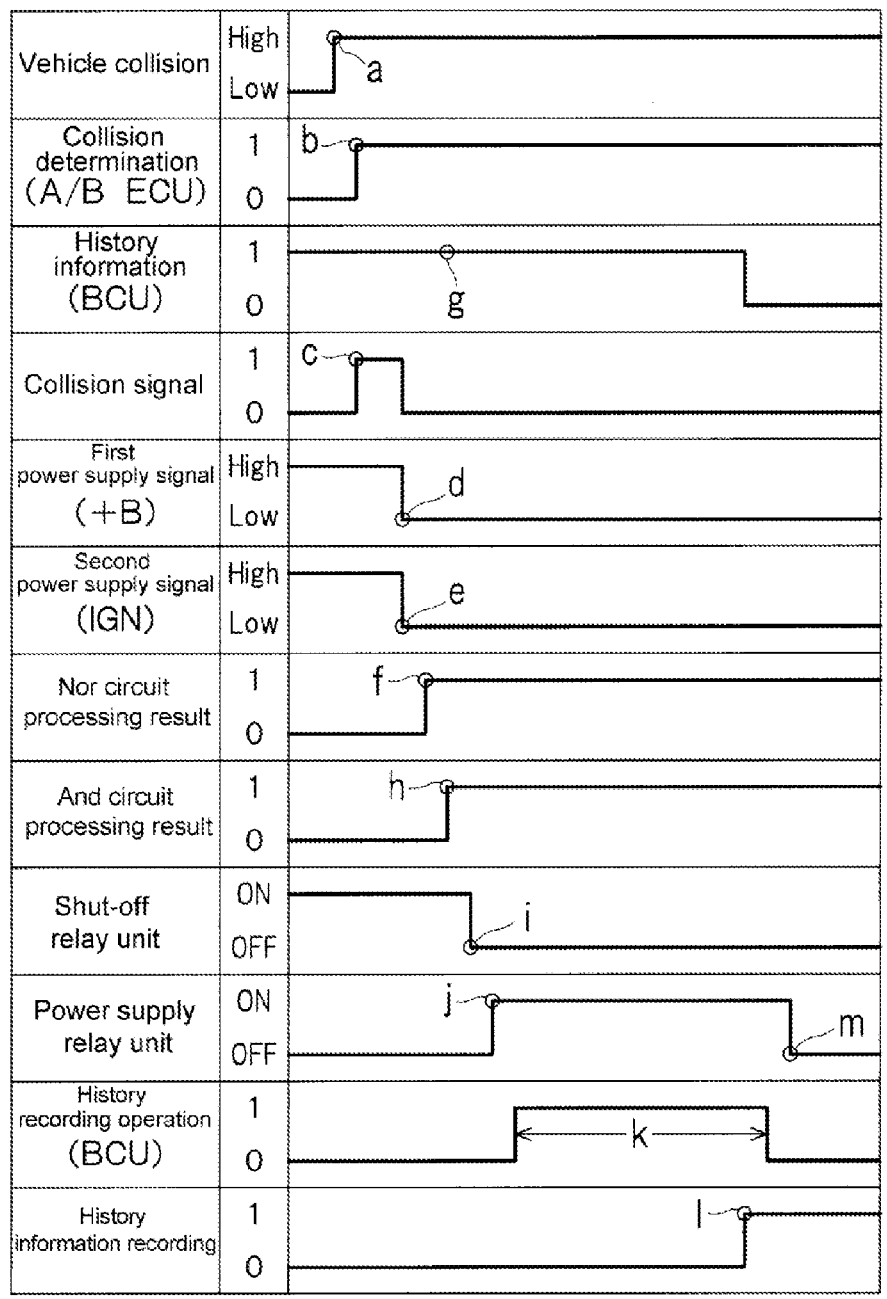
FIG. 4 is a timing chart illustrating procedures until history information is recorded since a vehicle collision.

Next, procedures until the history information is recorded in the battery controller 16 since the vehicle collision will be described based on a timing chart. FIG. 4 is the timing chart illustrating the procedures until the history information is recorded since the vehicle collision. As illustrated in FIG. 4, when the electric vehicle 10 collides with an obstacle or the like (a reference mark a) and the air bag controller 23 determines that the vehicle collision occurs (a reference mark b), the collision signal is transmitted to the battery controller 16 from the air bag controller 23 (a reference mark c). In addition, when each of the first power supply signal (+B) and the second power supply signal (IGN) becomes the low potential signal (reference marks d and e), the high potential signal is outputted from the NOR circuit 45 (a reference mark f). Subsequently, in the case where the high potential signal is outputted from the NOR circuit 45 (the reference mark f), the battery controller 16 receives the collision signal (the reference mark c), and the history information is not recorded in the battery controller 16 (a reference mark g), the high potential signal is outputted from the AND circuit 46 (a reference mark h).

When the high potential signal is outputted from the AND circuit 46 (the reference mark h), the battery controller 16 switches the shut-off relay unit 29 to the opened state (a reference mark i) and switches the power supply relay unit 31 to the closed state (a reference mark j). That is, in the case where there is a possibility that the low-voltage battery 24 ceases to function as the power supply due to the vehicle collision, the battery controller 16 switches the power supply for the battery controller 16 from the low-voltage battery 24 to the high-voltage battery 15. With this, even in the case where the low-voltage battery 24 does not function as the power supply, it becomes possible to cause the battery controller 16 to function normally. Subsequently, the battery controller 16 executes a write operation to the history information recorder 30 (a reference mark k), and records the history information of the vehicle collision in the history information recorder 30 (a reference mark l).

When the recording of the history information in the battery controller 16 is completed (the reference mark l), the power supply relay unit 31 is switched from the closed state to the opened state (a reference mark m). With this, it is possible to separate the high-voltage battery 15 from the battery controller 16, and it becomes possible to improve safety. In addition, the electric power supply to the battery controller 16 is shut off, and hence it becomes possible to suppress degradation of the high-voltage battery 15. Particularly, in the case where the power supply relay unit 31 is switched to the closed state, the battery cells 32c and 32d as a part of the battery cells constituting the high-voltage battery 15 are discharged, and hence variations in the voltages of the individual battery cells 32a to 32f occur. That is, capacity deviation among the battery cells 32a to 32f is increased, but it becomes possible to maintain the performance of the high-voltage battery 15 by switching the power supply relay unit 31 to the opened state to thereby suppress the increase in capacity deviation.

Figure 5:
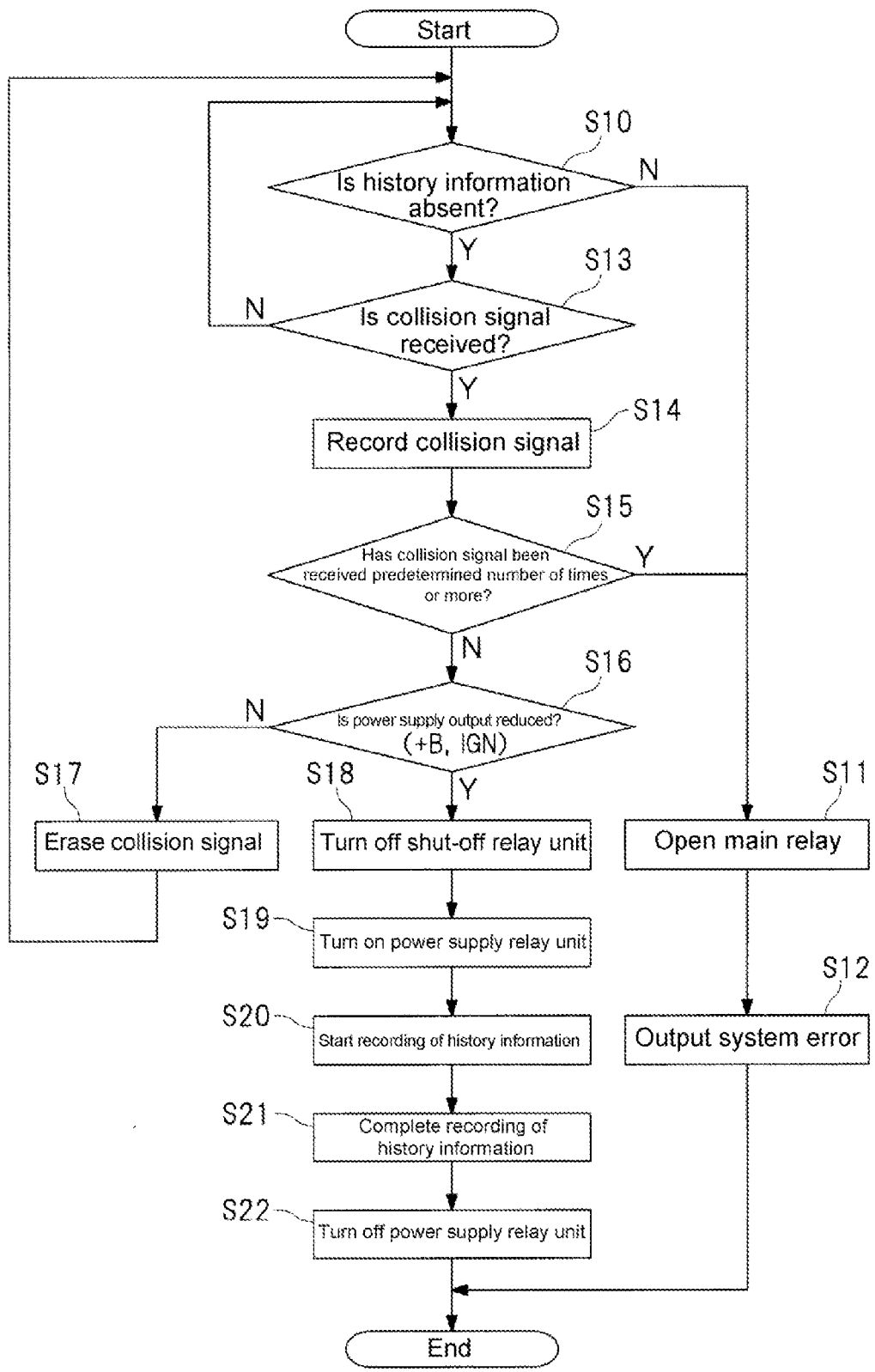
FIG. 5 is a flow chart illustrating procedures until the history information is recorded since the vehicle collision.

Next, procedures until the history information is recorded in the battery controller 16 since the vehicle collision will be described based on a flowchart. FIG. 5 is the flowchart illustrating the procedures until the history information is recorded since the vehicle collision. As illustrated in FIG. 5, in Step S10, it is determined whether or not the history information is recorded in the battery controller 16. In the case where it is determined that the history information is recorded in spite of the fact that the vehicle collision does not occur in Step S10, the flow advances to Step S11 and the main relay 14 of the high-voltage battery 15 is switched to the opened state, and the flow advances to Step S12 and a system error is outputted. On the other hand, in the case where it is determined that the history information is not recorded in Step S10, the flow advances to Step S13, and it is determined whether or not the collision signal is received from the air bag controller 23. In the case where it is determined that the collision signal is received in Step S13, the flow advances to Step S14, and the collision signal is recorded in the battery controller 16. In subsequent Step S15, it is determined whether or not the battery controller 16 has received the collision signal a predetermined number of times or more. In the case where it is determined that the battery controller 16 has received the collision signal the predetermined number of times or more in Step S15, the flow advances to Step S11 and the main relay 14 of the high-voltage battery 15 is switched to the opened state, and the flow advances to Step S12 and the system error is outputted.

In the case where it is determined that the battery controller 16 has not received the collision signal the predetermined number of times or more in Step S15, the flow advances to Step S16, and it is determined whether or not the output of the low-voltage battery 24 is reduced. In the case where the reduction in the output of the low-voltage battery 24 is not seen in Step S16, the flow advances to Step S17, the collision signal in the battery controller 16 is erased, and various conditions are determined again from Step S10. On the other hand, in the case where the reduction in the output of the low-voltage battery 24 is seen in Step S16, the flow advances to Step S18 and the shut-off relay unit 29 is switched to the opened state, and the flow advances to Step S19 and the power supply relay unit 31 is switched to the closed state. That is, in the case where there is a possibility that the low-voltage battery 24 ceases to function as the power supply due to the vehicle collision, the battery controller 16 switches the power supply for the battery controller 16 from the low-voltage battery 24 to the high-voltage battery 15. With this, even in the case where the low-voltage battery 24 does not function as the power supply, it becomes possible to cause the battery controller 16 to function normally.

Next, the flow advances to Step S20 and the recording of the history information of the vehicle collision in the battery controller 16 is started and, when the recording of the history information is completed in Step S21, the flow advances to Step S22 and the power supply relay unit 31 is switched from the closed state to the opened state. With this, it is possible to separate the high-voltage battery 15 from the battery controller 16, and it becomes possible to improve safety. In addition, since the electric power supply to the battery controller 16 is shut off, it becomes possible to suppress the degradation of the high-voltage battery 15. Particularly, in the case where the power supply relay unit 31 is switched to the closed state, since the battery cells 32c and 32d as a part of the battery cells constituting the high-voltage battery 15 are discharged, variations in the voltages of the battery cells 32a to 32f occur. That is, the capacity deviation among the battery cells 32a to 32f is increased, but it becomes possible to maintain the performance of the high-voltage battery 15 by switching the power supply relay unit 31 to the opened state to thereby suppress the increase in the capacity deviation.

The present invention is not limited to the implementation described above, and various changes can be made without departing from the gist thereof. The electric vehicle 10 to which the present invention is applied may be an electric car including the electric motor 12 as the power source, and may also be a hybrid car including the electric motor 12 and an engine as the power sources. In addition, the electric vehicle 10 may also be what is called a plug-in hybrid car capable of charging using an external power supply. Further, in the above description, although the first power supply signal (+B) and the second power supply signal (IGN) are used in order to determine the reduction in the output of the low-voltage battery 24, the present invention is not limited thereto, and only one of the first power supply signal (+B) and the second power supply signal (IGN) may be used. Furthermore, the reduction in the output of the low-voltage battery 24 may also be determined based on the current value of the low-voltage battery 24.

In the above description, although the battery controller 16 is caused to function as the output detector, the information recorder, and the controller, the present invention is not limited thereto, and other controllers may also be caused to function as the output detector, the information recorder, or the controller. Additionally, in the above description, although the air bag controller 23 is caused to function as the collision detector, the present invention is not limited thereto, and other controllers may also be caused to function as the collision detector. In addition, in the above description, although the power supply relay unit 31 functioning as the circuit opening/closing unit is configured by the semiconductor relays 33 and 34, the present invention is not limited thereto, and the power supply relay unit 31 may also be configured by a relay and a contactor that are driven by an electromagnetic force. Further, although the power supply relay unit 31 includes the pair of the semiconductor relays 33 and 34, the present invention is not limited thereto, and the power supply relay unit 31 may also be configured by one semiconductor relay.

In the case illustrated in FIG. 4, although the power supply relay unit 31 is closed after the shut-off relay unit 29 is opened, the invention is not limited thereto, and the shut-off relay unit 29 may also be opened after the power supply relay unit 31 is closed. In addition, the shut-off relay unit 29 may be opened and the power supply relay unit 31 may be closed at the same timing. Note that any type of the power storage unit may be used as the low-voltage battery 24 or the high-voltage battery 15. For example, it is possible to use a lead battery, a nickel-metal hydride battery, a lithium ion battery, an electric double layer capacitor, and a lithium ion capacitor.

The invention claimed is:

1. An electric vehicle comprising:
   a first power storage unit;
   a second power storage unit having a voltage higher than that of the first power storage unit;
   an output detector that detects an output of the first power storage unit;
   a collision detector that detects a vehicle collision;
   an information recorder to which the first power storage unit is electrically connected as a power source and which records collision information from the collision detector;
   a circuit opening/closing unit that is provided between the second power storage unit and the information recorder and is switched between an open state in which the second power storage unit and the information recorder are electrically separated from each other and a closed state in which the second power storage unit and the information recorder are electrically connected to each other; and
   a controller that switches the circuit opening/closing unit from the open state to the closed state in a case where the vehicle collision is detected by the collision detector and a reduction in the output of the first power storage unit is detected by the output detector, wherein
   the information recorder records the collision information from the collision detector by using the second power storage unit as a power source in the case when a vehicle collision is detected by the collision detector and the reduction in the output of the first power storage unit is detected by the output detector.

2. The electric vehicle according to claim 1, wherein the second power storage unit and the information recorder are provided integrally.

3. The electric vehicle according to claim 1, wherein the controller switches the circuit opening/closing unit from the closed state to the open state after the information recorder records the collision information by using the second power storage unit as the power source.

4. The electric vehicle according to claim 2, wherein the controller switches the circuit opening/closing unit from the closed state to the open state after the information recorder records the collision information by using the second power storage unit as the power source.

5. The electric vehicle according to claim 1, wherein the second power storage unit includes power storage elements connected in series, and the circuit opening/closing unit switched to the closed state connects a part of the power storage elements and the information recorder.

6. The electric vehicle according to claim 2, wherein the second power storage unit includes power storage elements connected in series, and the circuit opening/closing unit switched to the closed state connects a part of the power storage elements and the information recorder.

7. The electric vehicle according to claim 3, wherein the second power storage unit includes power storage elements connected in series, and the circuit opening/closing unit switched to the closed state connects a part of the power storage elements and the information recorder.

8. The electric vehicle according to claim 4, wherein the second power storage unit includes power storage elements connected in series, and the circuit opening/closing unit switched to the closed state connects a part of the power storage elements and the information recorder.

\* \* \* \* \*